US007211312B2

(12) United States Patent
Moosheimer

(10) Patent No.: US 7,211,312 B2
(45) Date of Patent: May 1, 2007

(54) FILM ELEMENT

(75) Inventor: Ulrich Moosheimer, Hohenkammer (DE)

(73) Assignee: Schreiner Group GmbH & Co. KG, Oberschleissheim (DE)

( * ) Notice: Subject to any disclaimer, the term of this patent is extended or adjusted under 35 U.S.C. 154(b) by 162 days.

(21) Appl. No.: 10/783,414

(22) Filed: Feb. 20, 2004

(65) Prior Publication Data

US 2004/0209043 A1 Oct. 21, 2004

(30) Foreign Application Priority Data

Feb. 20, 2003 (DE) ................................ 103 07 250

(51) Int. Cl.
*B32B 3/24* (2006.01)
*A61J 1/16* (2006.01)

(52) U.S. Cl. ........................ 428/136; 428/198; 428/43; 428/40.1; 383/17; 604/403; 604/408

(58) Field of Classification Search ................ 428/136, 428/198, 43, 40.1; 383/17; 604/403, 408
See application file for complete search history.

(56) References Cited

U.S. PATENT DOCUMENTS 6,635,334 B1 * 10/2003 Jackson et al. ............. 428/136
6,713,159 B1 * 3/2004 Blenke et al. .............. 428/198
2002/0056514 A1 * 5/2002 Grosskopf et al. .......... 156/268
2004/0219331 A1 * 11/2004 Moosheimer et al. ....... 428/131

FOREIGN PATENT DOCUMENTS

| | | |
|---|---|---|
| DE | 39 07 862 | 9/1990 |
| DE | 91 01 464.6 | 6/1991 |
| DE | 93 14 393.1 | 2/1994 |
| EP | 0 356 574 | 3/1990 |
| EP | 0 632 422 | 1/1995 |

* cited by examiner

*Primary Examiner*—William P. Watkins, III
(74) *Attorney, Agent, or Firm*—Collard & Roe, P.C.

(57) ABSTRACT

The zone of weakening, which is designed as a slot (6*a*), is bordered by film material (7) on both sides according to length, i.e., across the direction of loading, which is indicated by the arrows F. Tearing (8) which progresses from the edge because of microscopic damage comes to a standstill at the slot (6*a*) at the latest, because stress peaks are dissipated here and the locally increased stresses are diverted into elements of the film material (7) which are under less stress. Other embodiments include a locally interrupted adhesive layer for separation of an upper film layer from a lower film layer, these two film layers being otherwise glued together. The adhesive-free recesses here constitute zones of weakening in the sense of the present invention. This therefore prevents tears from spreading from one film layer to the next. Furthermore, the propagation of tearing is counteracted due to the dissipation of stresses when a tear that forms in the film layer reaches the zone of weakening.

4 Claims, 4 Drawing Sheets

*Fig. 1a*
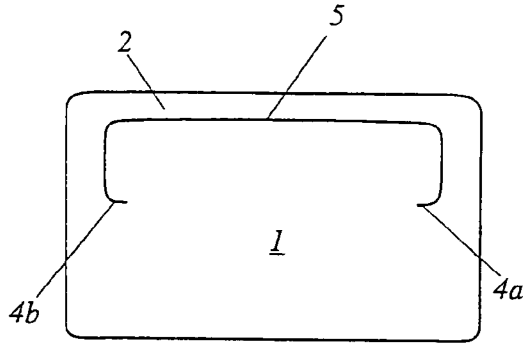
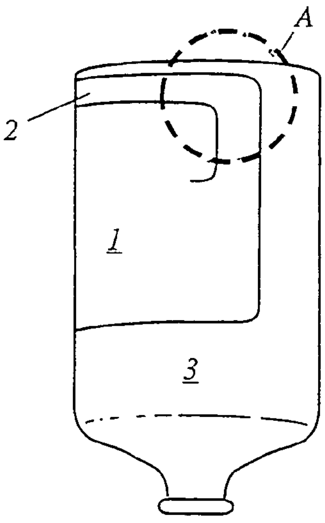
*Fig. 1b*
*Fig. 1c*
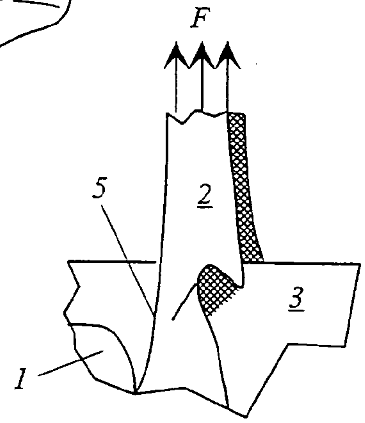
*Fig. 2a*
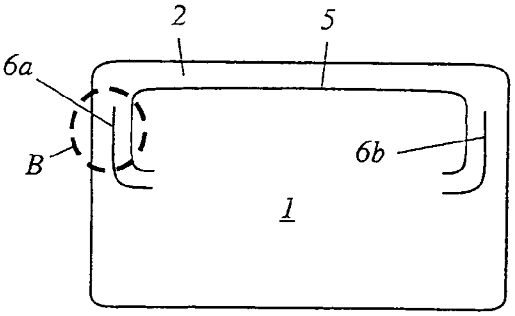
*Fig. 2b*
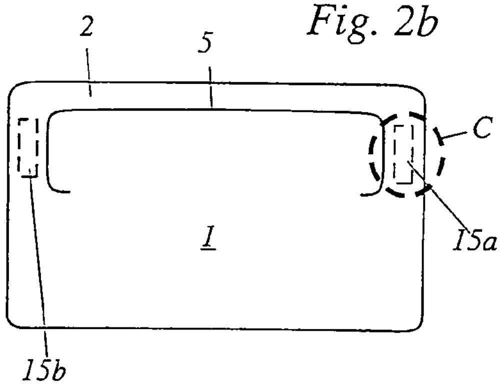
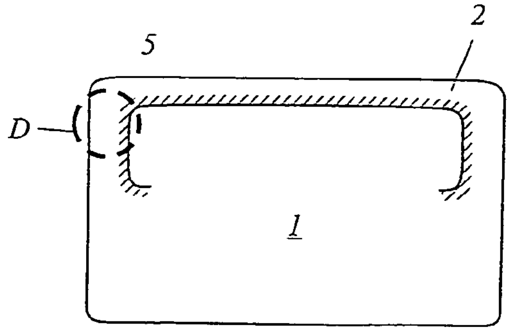
*Fig. 2c*

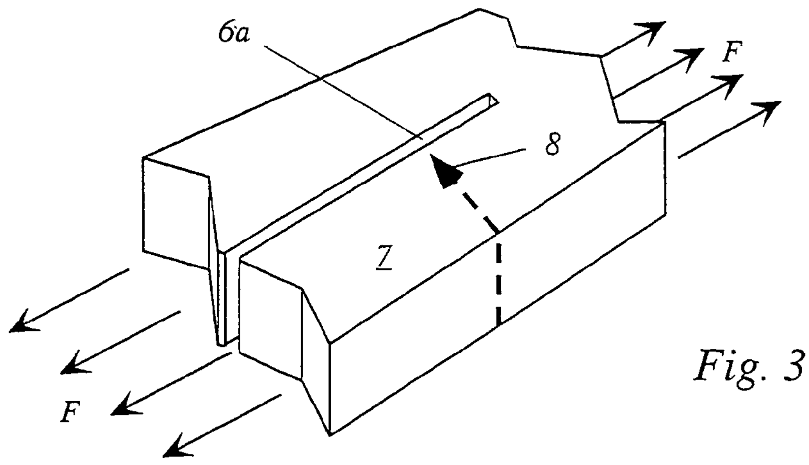
Fig. 3
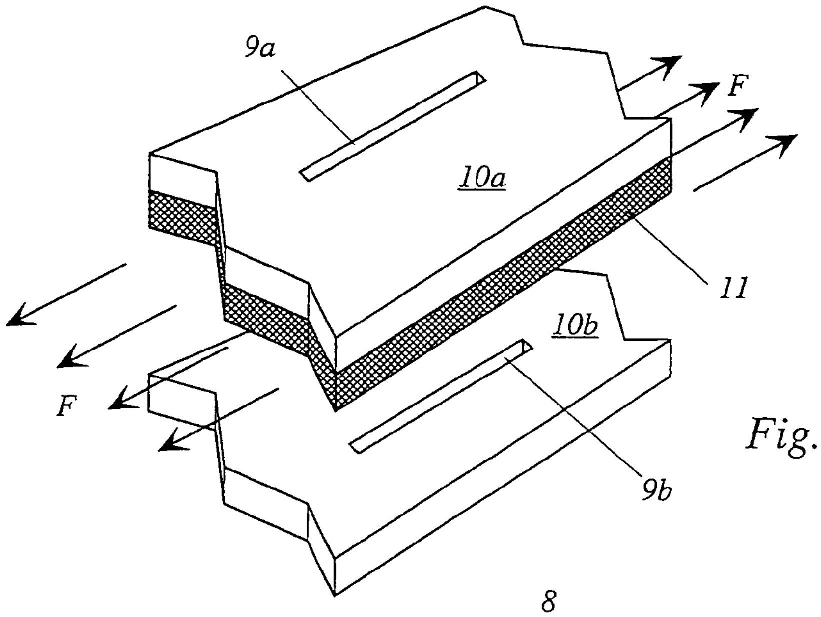
Fig. 4
Fig. 5
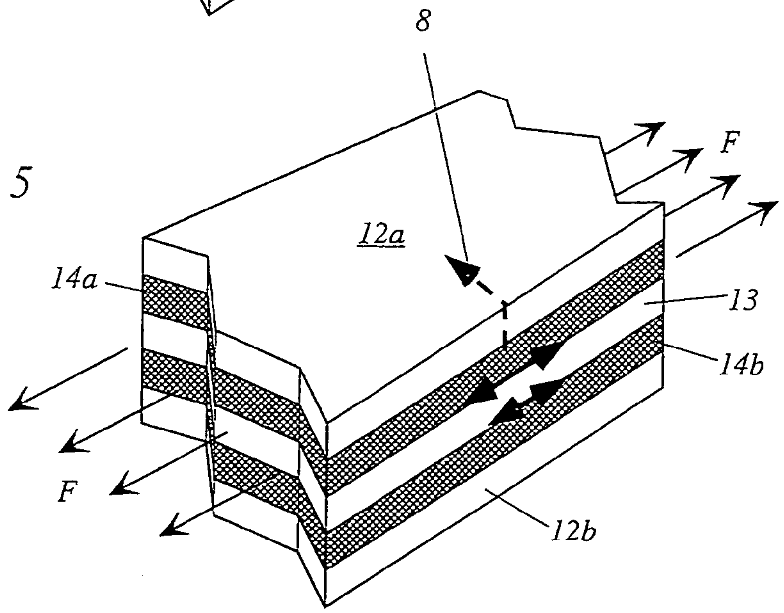

Fig. 6
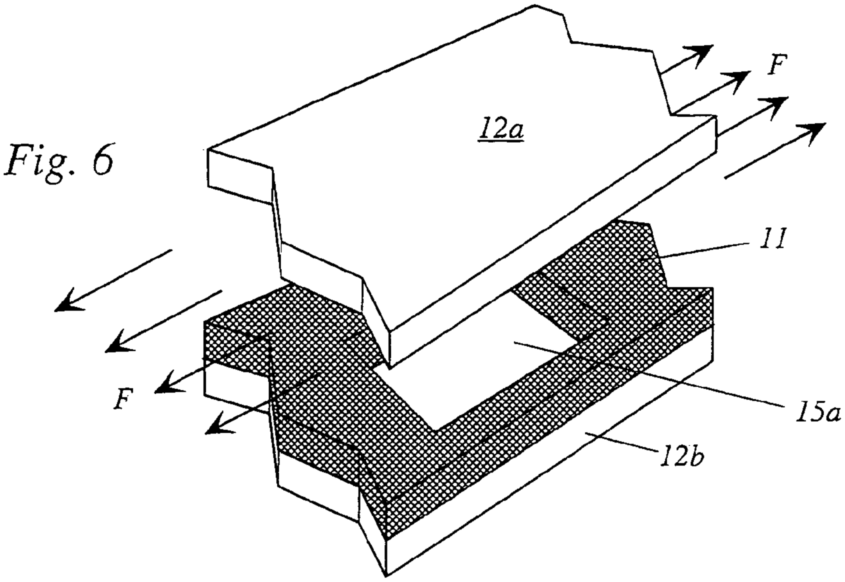
Fig. 7
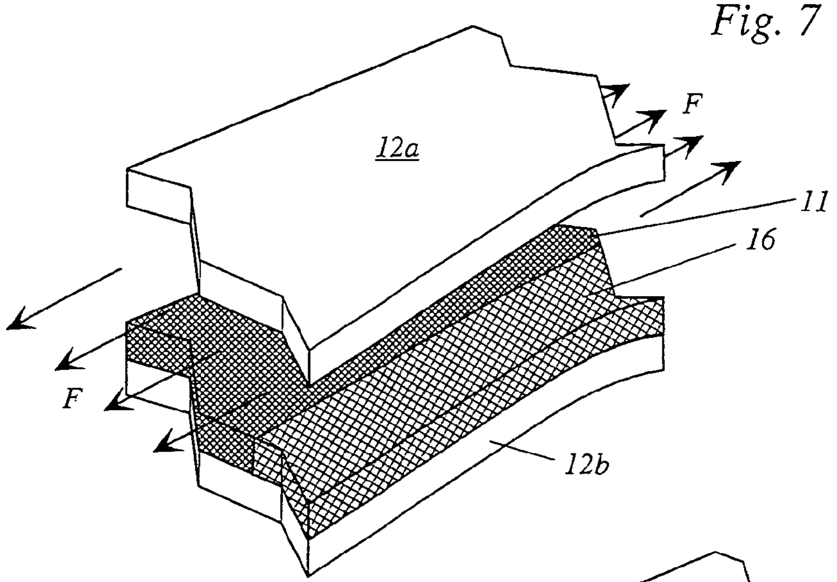
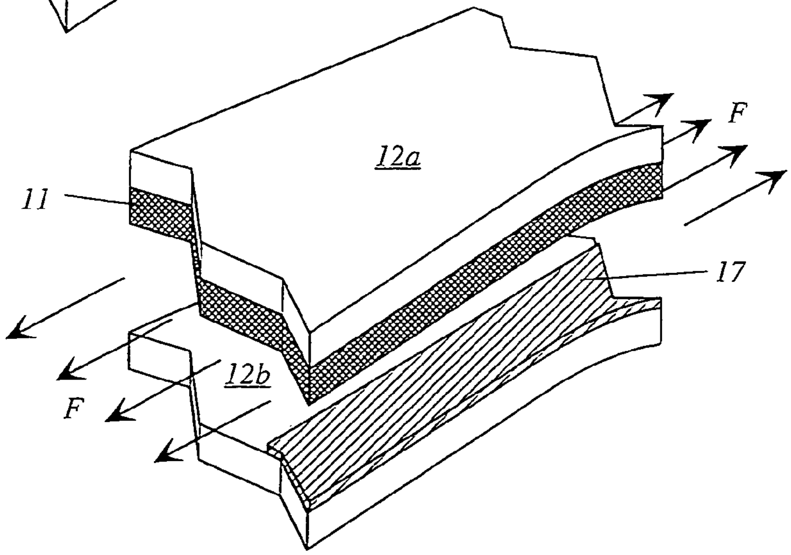
Fig. 8

FILM ELEMENT

BACKGROUND OF THE INVENTION

1. Field of the Invention

The present invention relates to a film element for absorbing tensile forces.

2. The Prior Art

Film elements are frequently used to transfer tensile forces in the direction of a longitudinal extent, e.g., as functional parts (in particular pressure-sensitive, i.e., self-stick) for carrying, connecting, sealing and/or covering objects. Examples from everyday life include adhesive tape and/or adhesive strips. Furthermore, a wide variety of loops, belts and hangers, shopping bags and/or shopping bags handles, load securing films (for example, over loaded pallets), sealing labels, signet labels and packaging films.

So-called hanger labels are used in the field of medicine in particular but also for pharmaceutical products. These hanger labels have a hanger-like hanging strap, which can be pulled out of the plane of the film of the remaining label, which is adhesively attached to a container, e.g., an infusion bottle. The container is suspended upside down by the hanging strap. The hanger-like hanging strap is then subjected to considerable tensile stresses, depending on the size and filling of the container.

Publications describing such hanger labels include German Patent DE 39 07 862 A1, German Utility Model DE 91 01 464 U1, European Patent EP 0 356 574 A2 and European Patent EP 0 632 422 A1, for example.

When a tensile stress acts on a film, microtears occur, starting in particular from minor defects in the material. At the end of tearing, locally elevated stresses occur, leading to propagation of the tear and ultimately to failure of the material, i.e., the film is torn all the way through.

Since the contours of hanger labels are usually produced by punching, it is possible for microtears to develop here starting from edge defects, which may result from poor punching results, e.g., due to worn a punch. These problems are even greater in rotary punching, which is considerably more productive than roller flat punching or planishing.

When the hanging strap of a hanger label is torn through, the container suspended by the hanger label falls down. In the case of an infusion bottle, this could have serious consequences for the patient being treated.

According to the state of the art, film parts which are acted upon by tension are designed with certain safety reserves by using thicker or more tear-resistant material, which is usually also much more expensive.

For example, various olefin films are used, which, although they have a greater tear propagation resistance and are thus less susceptible to damage, also have a greater elongation and a lower tensile strength, which is why very thick films (film thickness approximately 150–250 μm) must be used. Furthermore, multilayer film composites are also used. For example, a laminate of two layers of PET 75 μm and 50 μm thick will provide a greater security against damage than a single layer of PET with a thickness of 125 μm. Nevertheless, minor damage in critical regions of a hanger label, e.g., at the suspension point or at curved punched holes at the transition from a hanging strap to the glued regions of the label, may result in a significant loss of tensile strength.

Table 1 shows as an example the weakening of the hanger of a two-layer hanger label made of PET due to damage to the edge. This lists the tensile strength in newtons for the undamaged label and when there is slight damage to the edge of one of the layers.

TABLE 1

Tensile strength of a two-layer PET hanger

| | undamaged | damage to one layer | Damage to two layers |
|---|---|---|---|
| Tensile strength (N) | 206 | 50 | 1.4 |

As Table 1 clearly shows, a slight damage at the edge of one layer already means a considerable susceptibility to tearing with the associated reduction in tensile strength, while damage to the edge of both layers causes a reduction in tensile strength by several orders of magnitude.

Table 2 gives the tensile strength in newtons for the damaged and undamaged condition of 25-:m-wide single-layer and two-layer film strips made of different materials. In the case of materials "A" and "B," these are plastic materials having a lower stretchability and a greater tensile strength, whereas materials "C" and "D" are plastic materials having a greater stretchability and lower tensile strength. The :m values give the particular thickness of the film and/or the film layers.

TABLE 2

Tensile strength of 25 :m wide film strips

| Material | Tensile strength (N) undamaged | Tensile strength (N) damaged |
|---|---|---|
| "A" (125 μm) | 665 | less than 300 |
| "A" (75 μm) | 437 | 189 |
| "A" (50 μm) | 252 | 112 |
| "A" (75 μm/50 μm) | 556 | 246 (both layers damaged) |
| "B" (40 μm/40 μm) | 199 | 63 |
| "C" (101 μm) | 40 | 34 |
| "D" (165 μm) | 236 | 167 |
| "D" (60 μm) | 77 | 56 |

It is easy to see from Table 2 that with traditional film strips which are acted upon by a tensile stress, a great reduction in tensile strength is evidently unavoidable whenever there is damage to the edge.

SUMMARY OF THE INVENTION

In view of the problems described here, the object of the present invention is to create a film element for accommodating tensile forces which will have an increased security against tearing due to the development of cracks and/or tears. In particular it is also the object of the present invention to create a hanger label which can be used as a container hanging device and will have increased safety reserves in particular in the case of damage. On the other hand, the cost of materials is to be reduced and/or less expensive materials are to be used, while maintaining the same or greater security against tearing in comparison with traditional technical implementations.

According to one aspect of the present invention, this object is achieved by a film element for absorbing tensile forces, wherein the film element (1) has at least one zone of weakening (6*a*, 6*b*, 9*a*, 9*b*, 13, 15*a*, 15*b*, 16) which extends in the direction of action of the tensile forces (F) and reduces local stress peaks under load, this zone being provided in at least one region (A, B, C, D) which is at risk of tearing under load, said zone of weakening being bordered on both sides by unweakened material (7, 10$a$, 10$b$, 12$a$, 12$b$) in at least one direction across the direction of action of the tensile forces (F).

According to this invention, the load absorbing capacity and/or tear strength of film elements that absorb tensile forces, in particular hanger-like hanging straps is increased due to local weakening points, e.g., longitudinal slots in a manner that is completely surprising for those skilled in the art. The weakened zones, i.e., areas that are weakened locally due to longitudinal slots or the like, act as force distribution elements which distribute the forces along the weakened area into undamaged regions of material and/or are able to distribute the forces over a larger force-absorbing surface area. The reduces the maximum load occurring locally. In the case of tearing, the crack or tear will propagate only up to the weakened zone, where stress peaks are dissipated because the forces acting are split to a certain extent, thus reducing the load on individual segments of material. As a result, the force required for propagation of tearing and the tensile strength of the film material are increased.

The present invention may be used in particular to provide film elements with a clearly defined tear stop, i.e., a predetermined end of tearing. In other words, this invention also includes films which may tear only up to a certain point. Thus for example film-like airbag covers which tear only in a defined manner are also possible.

BRIEF DESCRIPTION OF THE DRAWINGS

On the basis of the respective drawings, examples of preferred exemplary embodiments of the present invention will now be explained in greater detail. The diagrams depicted here are not drawn to scale and in particular are to be interpreted as being merely schematic. In particular in the case of sectional diagrams, the layer thicknesses are greatly enlarged for reasons of simplicity and in some cases gaps between adjacent layers have been shown in the manner of an exploded diagram.

FIG. 1$a$ shows the basic shape of a hanger label with a hanging strap according to the state of the art. Inventive weakening zones are not emphasized visually here.

FIG. 1$b$ shows in a perspective view a hanger label of the basic shape depicted in FIG. 1$a$ glued to a container which is to be suspended overhead.

FIG. 1$c$ shows in a perspective view an enlarged detail of the region A, which is outlined with a dashed line in FIG. 1$b$, shown when the container is suspended overhead by the hanging strap.

FIG. 2$a$ shows a hanger label of the basic shape depicted in FIG. 1$a$ where the weakened zones are designed as longitudinal slots.

FIG. 2$b$ shows a multilayer hanger label of the basic shape depicted in FIG. 1$a$ where the weakened zones are designed as local adhesive-free areas between the film layers.

FIG. 2$c$ shows a hanger label of the basic shape depicted in FIG. 1$a$ where the weakened zones which are indicated with hatching are designed as edge areas where the gluing effect is weak.

FIG. 3 shows a perspective view of a section in region B which is outlined with dashed lines as part of the hanger label depicted in FIG. 2$a$.

FIG. 4 shows a perspective view of a section through another film element which is under tensile load whereby the weakened zones are designed as punched areas offset in relation to one another in different film layers.

FIG. 5 shows a perspective view of a section through another film element under tensile stress where the weakened zone is designed as an intermediate layer having a low modulus of elasticity.

FIG. 6 shows a perspective view of a section in region C which is outlined with dashed lines of the hanger label depicted in FIG. 2$b$.

FIG. 7 shows a perspective view of a section through region D which is shown with a dashed outline in the hanger label depicted in FIG. 2$c$.

FIG. 8 shows a perspective view of a section through an alternative embodiment of the hanger label depicted in FIG. 2$c$, showing region D bordered with a dashed line.

DETAILED DESCRIPTION OF THE PREFERRED EMBODIMENT

Figure 9:
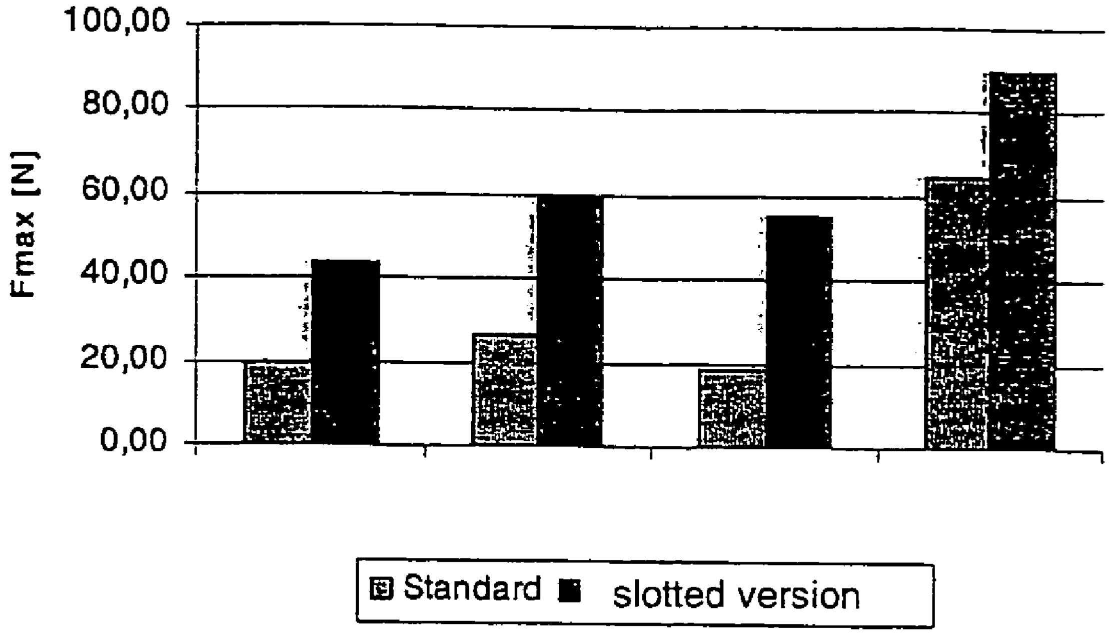
FIG. 9 shows a diagram which illustrates the increased tensile strength of an inventive hanger label with slots in comparison with an unslotted hanger label according to the state of the art.

FIG. 1$a$ shows the basic shape based on the state of the art for an inventive hanger label 1 with a punched hanging strap 2, whereby the inventive weakened zones are not emphasized visually here. The end regions 4$a$, 4$b$ of the punched shape 5 may have different designs; in addition to the variant depicted here, advantageous shapes which are known from the state of the art, for example, a spiral shape, may also be provided. FIG. 1$b$ shows the hanger label one glued as intended to a container 3, which may be, for example, an infusion bottle which is to be suspended upside down, by means of a self-stick coating. The region A, which is bordered with a dashed line, is shown on an enlarged scale in FIG. 1$c$ for the case when the container is suspended upside down by the hanging strap 2. This shows clearly that as in the state of the art, the area close to the punched part 5 on the hanging strap 2 must absorb the greatest part of the tensile forces F. In the case of hanger labels designed according to the state of the art, the risk of tearing is also particularly great here.

FIG. 2$a$ shows a hanger label designed according to the basic design illustrated in FIG. 1$a$, having slots 6$a$, 6$b$ in the hanging strap 2 which are oriented in the direction of the load (when used as intended). The slots 6$a$, 6$b$ can be produced by punching or cutting and either pass through the film or film layer or reduce its thickness locally simply in the manner of a groove.

FIG. 3 shows the region B (bordered with a dashed line) of the hanger label 1, shown in FIG. 2$a$, in a sectional perspective view (different film elements under tensile stress may of course also be designed accordingly). The weakened zone, which is designed as a slot 6$a$, is bordered on both sides by the film material 7 according to length, i.e., across the direction of loading as indicated by the arrows F. The tearing 11, which progresses from the edge because of microscopic damage, stops here at the slot 6$a$ at the latest, because this is where the stress peaks are dissipated and the locally increased stresses are diverted into elements of the film material 7 that are under a lower load.

FIG. 4 shows a two-layer design in which the slots 9$a$, 9$b$ are arranged in the film layers 10$a$, 10$b$ so that they are offset in relation to one another. The film layers 10$a$, 10$b$ are joined together by an adhesive layer 11. The bottom film layer 10$b$ is shown as being separate from the two other layers 10$a$, 11 only for reasons of comprehensibility. Due to the offset arrangement, this yields greater reserves of security if the film element also has an edge defect in both film layers 10*a*, 10*b* at the same time.

FIG. 5 shows a film element which has an intermediate layer 13 glued between the film layers 12*a* and 12*b*, its modulus of elasticity being lower than the modulus of elasticity of the film layers 12*a*, 12*b* and which thus constitutes a weakened zone in the sense of this invention which is bordered at the top and bottom by the film layers 12*a*, 12*b*, i.e., across the direction of loading indicated by the force errors F. As tearing 8 progresses in the upper film layer 12*b*, the intermediate layer 13 becomes stretched due to the transfer of force to the adhesive layer 14*a*. Due to different intensities of stretching at the top and bottom sides of the relatively soft intermediate layer 13 (indicated by double arrows of different lengths), a stress is built up locally and the tearing is not transmitted further to the bottom film layer 12*b* through the adhesive layer 14*b*.

FIGS. 2*b* and 6 show a locally interrupted adhesive layer 11 for separation of an upper film layer 12*a* from a lower film layer 12*b*. The adhesive-free recesses 15*a*, 15*b* here constitute zones of weakening in the sense of the present invention. As explained in conjunction with FIG. 5, the propagation of tearing from one film layer 12*a*, 12*b* to the other is thus prevented. In addition, by dissipating stresses, the propagation of tearing is counteracted when a tear originating in a film layer 12*a*, 12*b* reaches the zone of weakening 15*a*. The top film layer 12*a* is depicted as separated from the two other layers 11, 12*b* merely for reasons of comprehensibility.

FIGS. 2*c*, 7 and 8 show a locally weakened adhesive layer 11 for separation of an upper film layer 12*a* from a lower film layer 12*b*. The zones of weakening according to this invention, the position of which is indicated by hatching in FIG. 2*c*, consist here of a local weakening of the adhesive layer 11 which is bordered at the top and bottom by the unweakened film layers 12*a*, 12*b*. It is advantageous here in particular that the zones of weakening are situated here in boundary areas that are at particular risk, i.e., in the rounded part of the punched pattern 5 near the end. According to the alternative depicted in FIG. 7, the weakening consists of an adhesive 16 which has a reduced adhesive effect and/or a lower viscosity or less crosslinking locally. In the alternative depicted in FIG. 8, the weakening consists of an adhesive-repellent coating 17 on the bottom layer 12*b*, this adhesive-repellent layer being provided locally. This may be, for example, a siliconizing layer. Again for reasons of comprehensibility, FIG. 7 shows the top film layer 12*a* and FIG. 8 shows the bottom film layer 12*b* together with the adhesive-repellent coating 17, each depicted as separated from the remainder of the film laminate. One possible embodiment would also be local neutralization of the adhesive.

It is thus self-evident that the embodiments of the weakened zones which are depicted here on the basis of examples may also be combined with one another.

The efficacy of the inventive measures for increasing the tensile strength is illustrated on the basis of the bar graph in FIG. 9, where the tensile strength $F_{max}$ in newtons is plotted for PET-polyolefin film laminates of different layer structures. This is shown for hanger labels 1 which are designed in a helical pattern in the end area 4*a*, 4*b* of the punched pattern 5 that defines the hanging strap 2. The bar on the left, which is lighter in color, represents the tensile strength of an unslotted version according to the state of the art, while the darker bar on the right represents the tensile strength with slotting of the lower layer which is subject to particular stress in the area of the punched-out helical pattern, where the slotting is aligned in the longitudinal direction of the tensile load when the item is used as intended. The four pairs of bars in the chart stand for laminates with different layer thicknesses of the individual film layers. The higher load absorbing capacity of the slotted designs according to this invention can be seen here clearly.

In the experiment described here, the hangers were damaged by a cut in the helical area. The zones of weakening according to this invention in the form of a slot here increase the tensile strength in an empirically reproducible manner and thus increase product safety of the hanger label with a material construction that is otherwise the same. In the event of an unwanted damage in practice, which cannot be ruled out, e.g., due to a worn punch, the measure according to this invention of introducing a zone of weakening is particularly advantageous.

The tearing properties may also be varied through appropriate adaptation of the following parameters: material construction, material thicknesses, types of material, degree of stretching, pigmentation, surface treatment. Thus, in particular for laminates of two or more layers, the following materials may be used in particular: polyethylene terephthalate (for the top and/or bottom layer(s)), polyolefins (for the top and/or bottom layer(s)), polyamides (for the top and/or bottom layer(s)), polypropylene (for the top layer), oriented polypropylene (for the top and/or bottom layer(s)), polybutylene terephthalate (for the top layer), nonwovens (for the top layer), mesh structures.

What is claimed is:

1. A film element (1) in the form of a hanger label having a hanging strap that is delimited by a punched area and can be pivoted out of or pulled away from a remaining surface of the hanger label, said hanging strap absorbing tensile forces when in use, wherein the film element (1) has at least one film layer with at least one zone of weakening (6*a*, 6*b*, 9*a*, 9*b*, 13, 15*a*, 15*b*, 16) which extends in the direction of action of the tensile forces (F) and reduces local stress peaks under load, this zone being provided in at least one region (A, B, C, D) of the hanging strap which is at risk of tearing under load, said zone of weakening being bordered within the film layer on both sides by unweakened material (7, 10*a*, 10*b*, 12*a*, 12*b*) in a direction across the direction of action of the tensile forces (F), wherein the zone of weakening has at least one longitudinal slot (9*a*, 9*b*) that passes through only one film layer (10*a*, 10*b*).

2. The film element according to claim 1, wherein the film element (1) has at least two film layers (10*a*, 10*b*, 12*a*, 12*b*).

3. The film element according to claim 2, wherein the film layers (10*a*, 10*b*, 12*a*, 12*b*) are at least partially bonded, welded or sealed to one another.

4. The film element according to claim 1, wherein the film element has a plurality of longitudinal slots (9*a*, 9*b*) that are offset in relation to one another in different film layers (10*a*, 10*b*).

* * * * *